(12) United States Patent
Miklós et al.

(10) Patent No.: US 12,132,628 B2
(45) Date of Patent: Oct. 29, 2024

(54) TECHNIQUE FOR MONITORING A REDUNDANCY STATUS OF A CONNECTION

(71) Applicant: Telefonaktiebolaget LM Ericsson (publ), Stockholm (SE)

(72) Inventors: György Miklós, Pilisborosjenö (HU); János Farkas, Kecskemét (HU); Balázs Varga, Budapest (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 874 days.

(21) Appl. No.: 17/283,987

(22) PCT Filed: Oct. 12, 2018

(86) PCT No.: PCT/EP2018/077847
§ 371 (c)(1),
(2) Date: Apr. 9, 2021

(87) PCT Pub. No.: WO2020/074091
PCT Pub. Date: Apr. 16, 2020

(65) Prior Publication Data
US 2021/0359926 A1 Nov. 18, 2021

(51) Int. Cl.
*H04L 12/26* (2006.01)
*H04L 41/06* (2022.01)
(Continued)

(52) U.S. Cl.
CPC .......... *H04L 43/0817* (2013.01); *H04L 41/06* (2013.01); *H04W 24/08* (2013.01)

(58) Field of Classification Search
CPC ..... H04W 76/15; H04W 76/40; H04W 76/28; H04W 92/20; H04W 76/20; H04W 88/06;
(Continued)

(56) References Cited

U.S. PATENT DOCUMENTS

| 5,859,959 A | 1/1999 | Kimball et al. |
| 9,860,803 B2 * | 1/2018 | Mochizuki ........ H04W 36/0085 |

(Continued)

FOREIGN PATENT DOCUMENTS

| CN | 102293027 A | 12/2011 |
| EP | 1734694 A1 | 12/2006 |

(Continued)

OTHER PUBLICATIONS

International Search Report and Written Opinion dated Apr. 24, 2019 for International Application No. PCT/EP2018/077847 filed Oct. 12, 2018, consisting of 16-pages.

(Continued)

*Primary Examiner* — Jung Liu
(74) *Attorney, Agent, or Firm* — Weisberg I.P. Law, P.A.

(57) ABSTRACT

A technique for monitoring a redundancy status of a connection established between a User Equipment, UE, and a cellular network is disclosed, wherein the connection is established using redundant communication paths between the UE and the cellular network. A method implementation of the technique is performed by a first node of the cellular network and comprises triggering determining a current redundancy status of the connection, the current redundancy status indicating whether or not the redundant communication paths are fully disjoint on at least a portion of the redundant communication paths, and triggering sending a redundancy notification to a second node of the cellular network, the redundancy notification including an indication of the determined current redundancy status.

16 Claims, 13 Drawing Sheets

(51) Int. Cl.
*H04L 43/0817* (2022.01)
*H04W 24/08* (2009.01)

(58) Field of Classification Search
CPC ............... H04W 76/22; H04W 76/12; H04W 36/00695; H04W 28/0864; H04W 28/0835; H04W 28/0967; H04W 72/27; H04L 5/0032; H04L 5/001; H04L 5/0053
See application file for complete search history.

(56) References Cited

U.S. PATENT DOCUMENTS

| | | | | |
|---|---|---|---|---|
| 10,237,027 | B2* | 3/2019 | Der Velde | H04W 76/28 |
| 10,257,875 | B2* | 4/2019 | Nagasaka | H04W 74/08 |
| 10,708,969 | B2* | 7/2020 | Stauffer | H04W 72/21 |
| 11,076,317 | B2* | 7/2021 | Futaki | H04W 76/15 |
| 11,146,995 | B2* | 10/2021 | Yang | H04W 36/0027 |
| 11,234,286 | B2* | 1/2022 | Shimoda | H04W 16/32 |
| 11,240,700 | B2* | 2/2022 | Han | H04L 45/24 |
| 11,323,911 | B2* | 5/2022 | Dai | H04W 76/12 |
| 11,576,080 | B2* | 2/2023 | Futaki | H04W 76/22 |
| 11,576,222 | B2* | 2/2023 | Rinne | H04W 80/02 |
| 11,695,522 | B2* | 7/2023 | Van Der Velde | H04W 76/28 370/329 |
| 11,863,372 | B2* | 1/2024 | Yoo | H04L 41/0668 |
| 2008/0101396 | A1 | 5/2008 | Miyata | |
| 2014/0335882 | A1* | 11/2014 | Lee | H04W 76/15 455/452.2 |
| 2015/0223212 | A1* | 8/2015 | Der Velde | H04W 76/15 370/329 |
| 2016/0227561 | A1* | 8/2016 | Susitaival | H04W 28/0278 |
| 2016/0338134 | A1* | 11/2016 | Nagasaka | H04W 76/10 |
| 2018/0054846 | A1* | 2/2018 | Nagasaka | H04W 76/15 |
| 2019/0215114 | A1* | 7/2019 | Van Der Velde | H04W 76/15 |
| 2020/0374320 | A1* | 11/2020 | Li | H04L 63/205 |
| 2021/0075567 | A1* | 3/2021 | Van Der Velde | H04W 76/40 |
| 2023/0232491 | A1* | 7/2023 | Shimoda | H04W 16/32 370/328 |
| 2024/0129181 | A1* | 4/2024 | Yoo | H04W 28/0252 |

FOREIGN PATENT DOCUMENTS

| | | |
|---|---|---|
| JP | 2016163232 A | 9/2016 |
| WO | 2017137075 A1 | 8/2017 |

OTHER PUBLICATIONS

SA WG2 Meeting #127-Bis S2-185002; Title: Updating 6.5 Solution 5 to use multiple addresses at a MPTCP Proxy; Source: ETRI; Agenda Item: 6.8; Document for: Approval; Work Item/Release: FS_ATSSS/Rel-16; Date and Location: May 28-Jun. 1, 2018, Newport Beach, USA, consisting of 7-pages.

3GPP TS 23.502 V16.7.1; 3rd Generation Partnership Project; Technical Specification Group Services and System Aspects; Procedures for the 5G System (5GS); Stage 2 (Release 16); Jan. 2021, consisting of 603-pages.

3GPP TR 23.725 V0.3.0; 3rd Generation Partnership Project; Technical Specification Group Services and System Aspects; Study on enhancement of Ultra-Reliable Low-Latency Communication (URLLC) support in the 5G core Network (5GC) (Release 16); Jul. 2018, consisting of 44-pages.

ETSI TS 138300 V15.8.0; 5G; NR; Overall description; Stage-2 (3GPP TS 38.300 version 15.8.0 Release 15), Jan. 2020, consisting of 102-pages.

ETSI TS 137340 V15.5.0; 5G; Universal Mobile Telecommunications System (UMTS); LTE; 5G; NR; Multi-connectivity; Overall description; Stage-2 (3GPP TS 37.340 version 15.5.0 Release 15), May 2019, consisting of 70-pages.

ETSI TS 136300 V14.2.0; LTE; Evolved Universal Terrestrial Radio Access (E-UTRA) and Evolved Universal Terrestrial Radios Access Network (E-UTRAN); Overall description; Stage 2 (3GPP TS 36.300 version 14.2.0 Release 14), Apr. 2017, consisting of 346-pages.

Chinese Office Action and Search Report with English Machine translation dated Feb. 2, 2024 for Patent Application No. 201880098643.0, consisting of 14 pages.

* cited by examiner

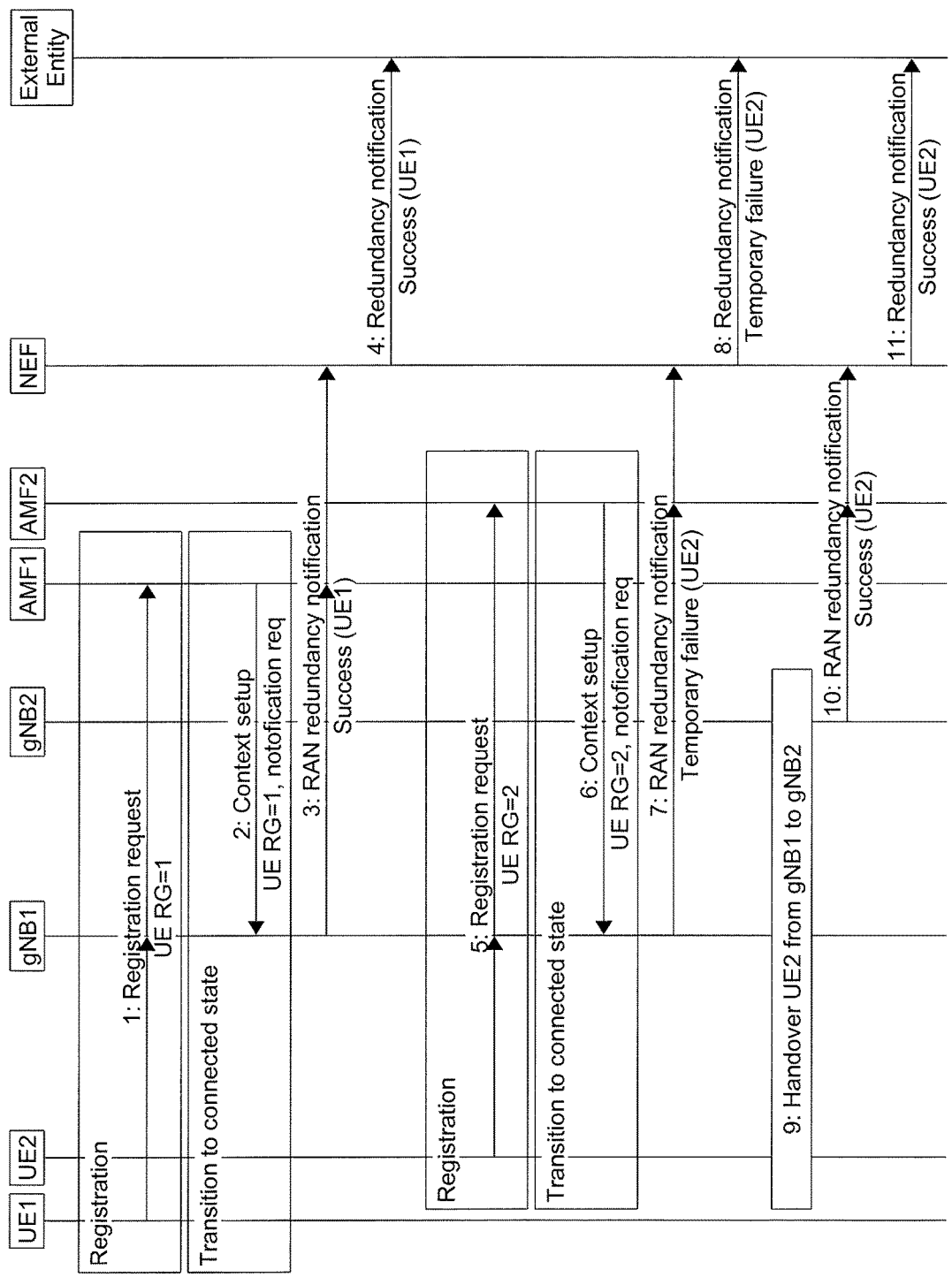

TECHNIQUE FOR MONITORING A REDUNDANCY STATUS OF A CONNECTION

CROSS-REFERENCE TO RELATED APPLICATIONS

This application is a Submission Under 35 U.S.C. § 371 for U.S. National Stage Patent Application of International Application Number: PCT/EP2018/077847, filed Oct. 12, 2018 entitled "TECHNIQUE FOR MONITORING A REDUNDANCY STATUS OF A CONNECTION," the entirety of which is incorporated herein by reference.

TECHNICAL FIELD

The present disclosure generally relates to the field of cellular networks. In particular, a technique for monitoring a redundancy status of a connection established between a User Equipment (UE) and a cellular network is presented. The technique may be embodied in methods, computer programs, apparatuses and systems.

BACKGROUND

Fifth generation (5G) mobile communication systems provide a much wider range of services than existing 3G or 4G systems and aim at providing support for Enhanced Mobile Broadband (eMBB), Massive Machine Type Communication (M-MTC) and Critical Machine Type Communication (C-MTC), for example. While low latency and high reliability are important characteristics for these types of services, high reliability is expected to be a basic requirement for a much wider range of services than low latency, especially in case of C-MTC services. Low latency and high reliability are important factors in industry/factory automation systems (e.g., high speed motion control, packaging, printing, etc.), for example, where guarantees on latency and reliability requirements generally provide sufficient service quality. However, high reliability is also important in use cases which have relaxed requirements on latency (e.g., where higher delay and/or higher jitter can be tolerated), such as in case of Intelligent Traffic Systems (ITSs) and remote control systems that operate with or without haptic feedback (e.g., robotized manufacturing, smart grids, Automated Guided Vehicles (AGVs), drone control, tele-surgery, etc.). In these cases, extremely low latency may not be the crucial factor, but instead extremely high reliability of the connections between application servers and the C-MTC devices.

To address requirements of extremely high reliability, various approaches have been proposed in the past. As an example, the Time-Sensitive Networking (TSN) task group of IEEE 802.1 has provided standardized solutions which satisfy high reliability requirements in fixed Ethernet networks. The Deterministic Networking (DetNet) working group of the Internet Engineering Task Force (IETF) provides similar solutions for layer 3 networks. The general approach of TSN/DetNet is illustrated in FIG. 1, which shows that a replication entity creates a replica of each Ethernet frame/IP packet and assigns a sequence number to it. An elimination entity then uses the sequence number to identify duplicates of the same frame/packet so that only a single copy of a given frame/packet is forwarded onwards. Such Frame Replication and Elimination for Reliability (FRER)/Packet Replication and Elimination for Reliability (PRER) function may be applied between intermediate switches or between end devices themselves. The paths taken by the replicated frames/packets are configured to be disjoint so that a fault on one path does normally not affect the other path.

For mobile communications systems, another approach involves equipping a terminal device with multiple physical UEs. As shown in FIG. 2, which illustrates an exemplary 5G system using such approach, disjoint communication paths, optionally including disjoint Protocol Data Unit (PDU) sessions, can be set up between the UEs and the network, and different Radio Access Network (RAN) entities (e.g., next generation NodeBs (gNBs)) can be selected for the UEs based on a static grouping. In the shown example, for the terminal device equipped with UE1 and UE2, the network provides redundant coverage with RAN entities gNB1 and gNB2, which are preferably selected such that UE1 connects to gNB1 and UE2 connects to gNB2. Separate User Plane Functions (UPFs) are used in the Core Network (CN) for each of the gNBs (indicated as UPF1 and UPF2 in the figure) in order to provide fully disjoint communication paths from the device to a data network (DN) via the cellular network.

Another exemplary approach dealing with the provision of high reliability is based on the Dual Connectivity (DC) feature of 4G or 5G networks. Dual connectivity allows a single UE which is equipped with two transceivers to have user plane connectivity with two base stations, while it is connected to a single base station only in the control plane. In a 5G system supporting dual connectivity, for example, the UE establishes two PDU sessions, wherein the CN of the cellular network requests the RAN to establish dual connectivity and to handle the first PDU session via a Master gNB (MgNB) and the second PDU session via a Secondary gNB (SbNB), and selects separate UPF entities in the network. Such setup is shown in FIG. 3.

While, in view of these approaches, disjoint user plane paths can generally be established to provide highly reliable communication, disjoint path establishment (in particular in the RAN) may nevertheless be inherently opportunistic. In fact, whether or not redundant communication paths can be implemented at a certain point of time may be subject to a number of factors, such as the current availability of redundant RAN coverage, the current radio link quality over the redundant paths, radio resource limitations based on the instantaneous traffic conditions and user mobility patterns, and node resource constraints, for example. Due to such unpredictable factors, it may happen that disjoint paths may momentarily not be realized and that the redundant user plane paths may traverse a same node, such as the same gNB in a RAN, for example. In other words, while redundancy may still apply over the air interface and other parts of the network, separate nodes (e.g., separate gNBs) for the provision of fully disjoint communication paths may in certain circumstances not be available throughout the network.

SUMMARY

Accordingly, there is a need for a technique which avoids one or more of the problems discussed above, or other problems.

According to a first aspect, a method for monitoring a redundancy status of a connection established between a UE and a cellular network is provided, wherein the connection is established using redundant communication paths between the UE and the cellular network. The method is performed by a first node of the cellular network and comprises triggering determining a current redundancy status of the connection, the current redundancy status indicating whether or not the redundant communication paths are fully disjoint on at least a portion of the redundant communication paths, and triggering sending a redundancy notification to a second node of the cellular network, the redundancy notification including an indication of the determined current redundancy status.

In the method, it may be that the redundant communication paths are to be implemented in accordance with a redundancy scheme requiring that the redundant communication paths are fully disjoint on at least the portion of the redundant communication paths. The method may further comprise receiving, prior to triggering determining the current redundancy status, a request from the second node to implement the redundancy scheme. When the redundancy scheme cannot be implemented momentarily, the current redundancy status may indicate that the redundant communication paths are not fully disjoint on at least the portion of the redundant communication paths. Determining the current redundancy status may be triggered repeatedly, wherein sending the redundancy notification may be triggered each time the current redundancy status is determined to have changed.

The current redundancy status may be determined based on a redundancy in an RAN of the cellular network. The current redundancy status may then indicate that the redundant communication paths are not fully disjoint on at least the portion of the redundant communication paths when the redundant communication paths include a same base station of the RAN. Also, the method may then further comprise triggering selecting a different base station of the cellular network for one of the redundant communication paths to make the redundant communication paths disjoint on at least the portion of the redundant communication paths.

Alternatively or additionally, the current redundancy status may be determined based on a redundancy in a CN of the cellular network. The current redundancy status may then indicate that the redundant communication paths are not fully disjoint on at least the portion of the redundant communication paths when the redundant communication paths include a same gateway node of the CN. Also, the method may then further comprise triggering selecting a different gateway node of the cellular network for one of the redundant communication paths to make the redundant communication paths disjoint on at least the portion of the redundant communication paths.

Sending the redundancy notification may be triggered upon lapse of a predetermined period of time after triggering determining the current redundancy status. The redundancy notification may include at least one of a reason for non-implementability of the redundancy scheme, and an indication on whether the reason is temporary or permanent. The method may further comprise receiving, prior to triggering sending the redundancy notification, a redundancy notification request from the second node to subscribe for receipt of redundancy notifications. The redundancy notification request may include at least one of an indication of a predetermined period of time upon which sending the redundancy notification is to be triggered after triggering determining the current redundancy status, and an indication on whether or not redundancy notifications are requested for temporary reasons for non-implementability of the redundancy scheme. The connection may correspond to at least one of a connection established between the UE and the cellular network, a session established between the UE and the cellular network, and a flow of a session established between the UE and the cellular network.

According to a second aspect, a method for monitoring a redundancy status of a connection established between a UE and a cellular network is provided, wherein the connection is established using redundant communication paths between the UE and the cellular network. The method is performed by a second node of the cellular network and comprises receiving a redundancy notification from a first node of the cellular network, the redundancy notification including an indication of a current redundancy status of the connection, the current redundancy status indicating whether or not the redundant communication paths are fully disjoint on at least a portion of the redundant communication paths.

The method according to the second aspect defines a method from the perspective of a second node which may be complementary to the method performed by the first node according to the first aspect. The first node and the second node of the second aspect may correspond to the first node and the second node described above in relation to the first aspect. As such, those aspects described with regard to the method of the first aspect which are applicable to the method of the second aspect may be comprised by the method of the second aspect as well, and vice versa.

The method of the second aspect may further comprise triggering an action based on the current redundancy status. When the current redundancy status indicates that the redundant communication paths are not fully disjoint on at least the portion of the redundant communication paths, the action may comprise at least one of releasing one of the redundant communication paths, re-establishing one of the redundant communication paths with a different configuration, pausing an application using the redundant communication paths for communication, applying at least one change to a network deployment associated with the redundant communication paths, and enhancing a network deployment associated with the redundant communication paths based on statistics collected on the current redundancy status. Alternatively or additionally, the method may further comprise triggering forwarding the current redundancy status to a third node.

As in the method of the first aspect, it may be that the redundant communication paths are to be implemented in accordance with a redundancy scheme requiring that the redundant communication paths are fully disjoint on at least the portion of the redundant communication paths. The method may further comprise triggering sending, prior to receiving the redundancy notification, a request to the first node to implement the redundancy scheme. When the redundancy scheme cannot be implemented momentarily, the current redundancy status may indicate that the redundant communication paths are not fully disjoint on at least the portion of the redundant communication paths.

The redundancy notification may include at least one of a reason for non-implementability of the redundancy scheme, and an indication on whether the reason is temporary or permanent. The method may further comprise triggering sending, prior to receiving the redundancy notification, a redundancy notification request to the first node to subscribe for receipt of redundancy notifications. The redundancy notification request may include at least one of an indication of a predetermined period of time upon which sending the redundancy notification is to be triggered after triggering determining the current redundancy status, and an indication on whether or not redundancy notifications are requested for temporary reasons for non-implementability of the redundancy scheme. The connection may correspond to at least one of a connection established between the UE and the cellular network, a session established between the UE and the cellular network, and a flow of a session established between the UE and the cellular network.

According to a third aspect, a computer program product is provided. The computer program product comprises program code portions for performing the method of at least one of the first aspect and the second aspect when the computer program product is executed on one or more computing devices (e.g., a processor or a distributed set of processors). The computer program product may be stored on a computer readable recording medium, such as a semiconductor memory, DVD, CD-ROM, and so on.

According to a fourth aspect, a first node of a cellular network for monitoring a redundancy status of a connection established between a UE and the cellular network is provided, wherein the connection is established using redundant communication paths between the UE and the cellular network. The first node is configured to perform any of the method steps presented herein with respect to the first aspect. The first node may comprise at least one processor and at least one memory, wherein the at least one memory contains instructions executable by the at least one processor such that the first node is operable to perform any of the method steps presented herein with respect to the first aspect.

According to a fifth aspect, a second node of a cellular network for monitoring a redundancy status of a connection established between a UE and the cellular network is provided, wherein the connection is established using redundant communication paths between the UE and the cellular network. The second node is configured to perform any of the method steps presented herein with respect to the second aspect. The second node may comprise at least one processor and at least one memory, wherein the at least one memory contains instructions executable by the at least one processor such that the second node is operable to perform any of the method steps presented herein with respect to the second aspect.

According to a sixth aspect, there is provided a system comprising a first node according to the fourth aspect and a second node according to the fifth aspect.

BRIEF DESCRIPTION OF THE DRAWINGS

Implementations of the technique presented herein are described herein below with reference to the accompanying drawings, in which:

FIG. 8 illustrates a signaling diagram of an exemplary procedure for monitoring a redundancy status of a connection in a RAN of a 5G network for the case of a redundancy scheme involving a terminal device with multiple physical UEs and redundant RAN nodes using static reliability groups according to the present disclosure;

DETAILED DESCRIPTION

In the following description, for purposes of explanation and not limitation, specific details are set forth in order to provide a thorough understanding of the present disclosure. It will be apparent to one skilled in the art that the present disclosure may be practiced in other embodiments that depart from these specific details.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Figure 4A:
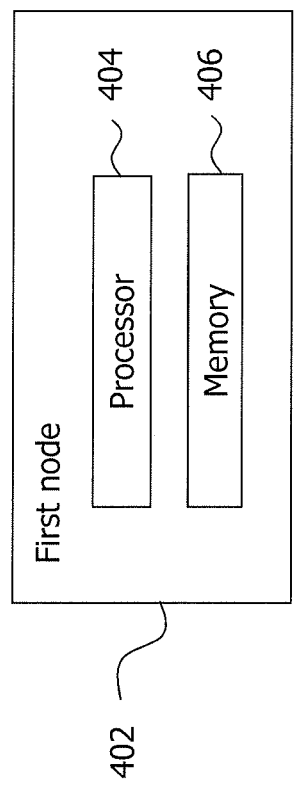
FIGS. 4*a* and 4*b* illustrate exemplary compositions of a first node and a second node according to the present disclosure.

FIG. 4*a* schematically illustrates an exemplary composition of a first node 402 for monitoring a redundancy status of a connection established between a UE and a cellular network, wherein the connection is established using redundant communication paths between the UE and the cellular network. The first node 402 comprises at least one processor 404 and at least one memory 406, wherein the at least one memory 406 contains instructions executable by the at least one processor 404 such that the first node 402 is operable to carry out the method steps described herein below.

Figure 4B:
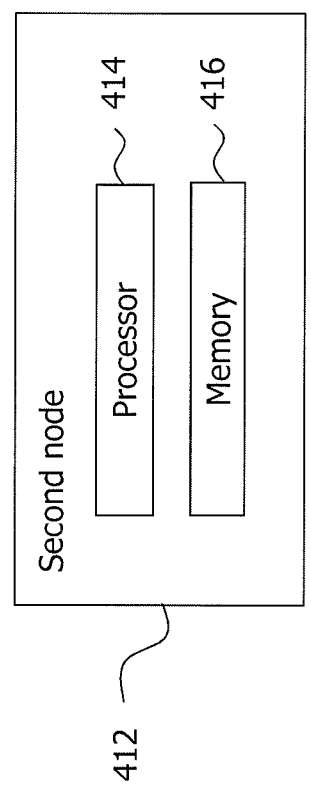

FIG. 4*b* schematically illustrates an exemplary composition of a second node 412 for monitoring a redundancy status of a connection established between a UE and a cellular network, wherein the connection is established using redundant communication paths between the UE and the cellular network. The second node 412 comprises at least one processor 414 and at least one memory 416, wherein the at least one memory 416 contains instructions executable by the at least one processor 414 such that the second node 412 is operable to carry out the method steps described herein below.

It will be understood that each of the first node 402 and the second node 412 may be implemented on a physical computing unit or a virtualized computing unit, such as a virtual machine, for example. It will further be appreciated that each of the first node 402 and the second node 412 may not necessarily be implemented on a standalone computing unit, but may be implemented as components—realized in software and/or hardware—residing on multiple distributed computing units as well, such as in a cloud computing environment, for example.

Figure 5A:
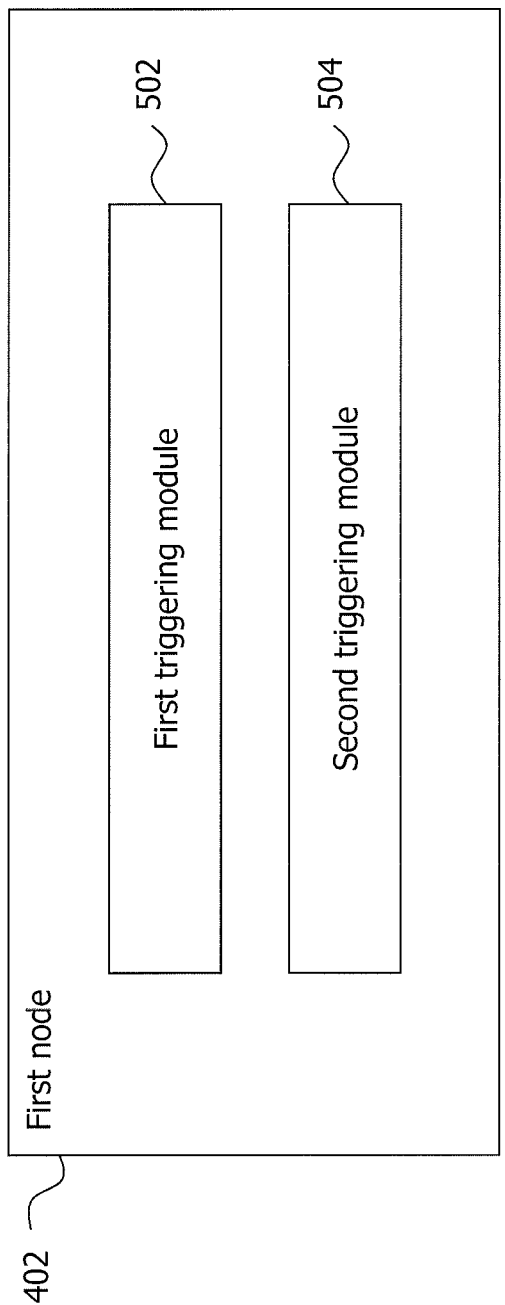
FIGS. 5*a* and 5*b* illustrate a modular composition of the first node and a corresponding method embodiment which may be performed by the first node.
Figure 5B:
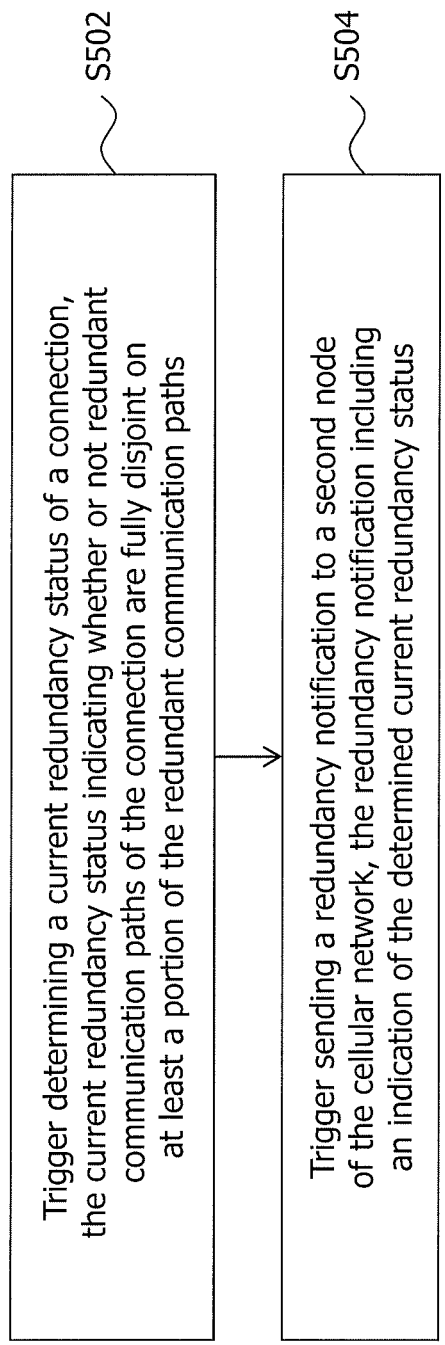

FIG. 5a schematically illustrates an exemplary modular composition of the first node 402 and FIG. 5b illustrates a corresponding method which may be performed by the first node 402. The basic operation of the first node 402 will be described in the following with reference to both FIGS. 5a and 5b.

In step S502, a first triggering module 502 of the first node 402 triggers determining a current redundancy status of the connection, wherein the current redundancy status indicates whether or not the redundant communication paths are fully disjoint on at least a portion of the redundant communication paths. In step S504, a second triggering module 504 of the first node 402 triggers sending a redundancy notification to a second node of the cellular network (e.g., the second node 412), wherein the redundancy notification includes an indication of the determined current redundancy status.

The redundant communication paths of the connection between the UE and the cellular network may comprise at least two communication paths established between the UE and the cellular network so that traffic transmitted over the connection may travel from the UE to and within the cellular network along at least two separate communication paths before the traffic is forwarded to a data network (DN) for further processing. As in the TSN/DetNet example described above for the case of fixed networks, packets to be transmitted may be replicated before their transmission over the redundant communication paths and duplicates of the packets may be eliminated at the end of the redundant communication paths so that only a single copy of a given packet is forwarded to the data network. In order to provide full redundancy for the connection, the redundant communication paths may be fully disjoint so that, along the extension of the redundant communication paths, the paths do not traverse (or "share") a same node of the cellular network. Due to circumstances such as a current non-availability of redundant RAN coverage or node resource constraints, for example, it may happen that not every node along the redundant communication paths can be provided redundantly and that, therefore, the redundant communication paths—at least momentarily—have to traverse a same node of the cellular network. In this case, the redundant communication paths may be said to be not fully disjoint.

According to the technique presented herein, a current redundancy status of the connection may thus be determined, wherein the current redundancy status indicates whether or not the redundant communication paths are fully disjoint on at least a portion of the redundant communication paths. The portion of the redundant communication paths may belong to a subdomain (or "subnetwork") of the cellular network, such as the RAN or the CN, for example. The redundant communication paths may thus not be fully disjoint on at least the portion of the redundant communication paths if the redundant communication paths traverse a same node in the subdomain of the cellular network. The first node 402 of the cellular network may reside in the subdomain and may locally trigger determining whether full redundancy can be provided within the subdomain. By then triggering sending the redundancy notification indicating the determined current redundancy status to the second node of the cellular network (which may reside in another subdomain of the cellular network, or even be located externally to the cellular network), the first node 402 may provide information on the availability of redundancy within the subdomain to another node, which may then take action accordingly. The action may be directed to preventing negative effects that may potentially be caused by current non-availability of the expected redundancy. For example, when the current redundancy status indicates that the redundant communication paths are not fully disjoint on at least the portion of the redundant communication paths, the second node may release one of the redundant communication paths, re-establish one of the redundant communication paths with a different configuration, pause an application using the redundant communication paths for communication, apply at least one change to a network deployment associated with the redundant communication paths, and/or enhance a network deployment associated with the redundant communication paths based on statistics collected on the current redundancy status. Alternatively or additionally, the second node may forward the current redundancy status to a third node (optionally along a whole chain of network nodes), which may then trigger such actions.

The cellular network may be a 5G network, for example, but it will be understood that the technique presented herein may be applied in other mobile communication networks as well, such as 3G or 4G networks, for example. In case of the subdomain being a RAN, the first node 402 may be a base station of the RAN, such as a gNB in case of a 5G network, and the second node may correspond a node of the CN, such as an Access and Mobility Function (AMF), a Session Management Function (SMF) or a User Plane Function (UPF) in case of a 5G network, for example. If the second node is external to the cellular network, the second node may correspond to a Centralized Network Configuration (CNC) or a Centralized User Configuration (CUC) entity, as known from TSN, for example. In case of the subdomain being a CN, the first node 402 may be a gateway node of the CN, such as a UPF in case of a 5G network, for example.

Figure 1:
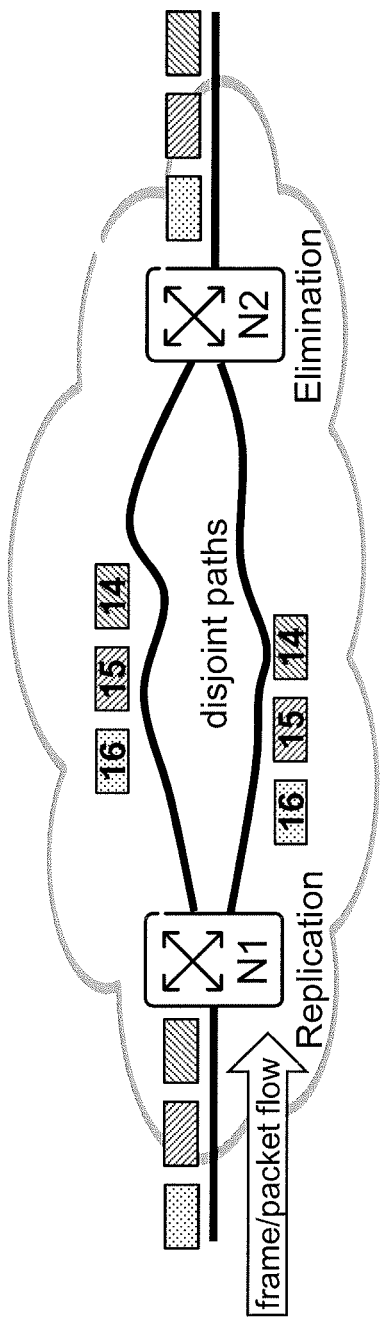
FIG. 1 illustrates an exemplary TSN/DetNet system providing support for communication with high reliability.
Figure 2:
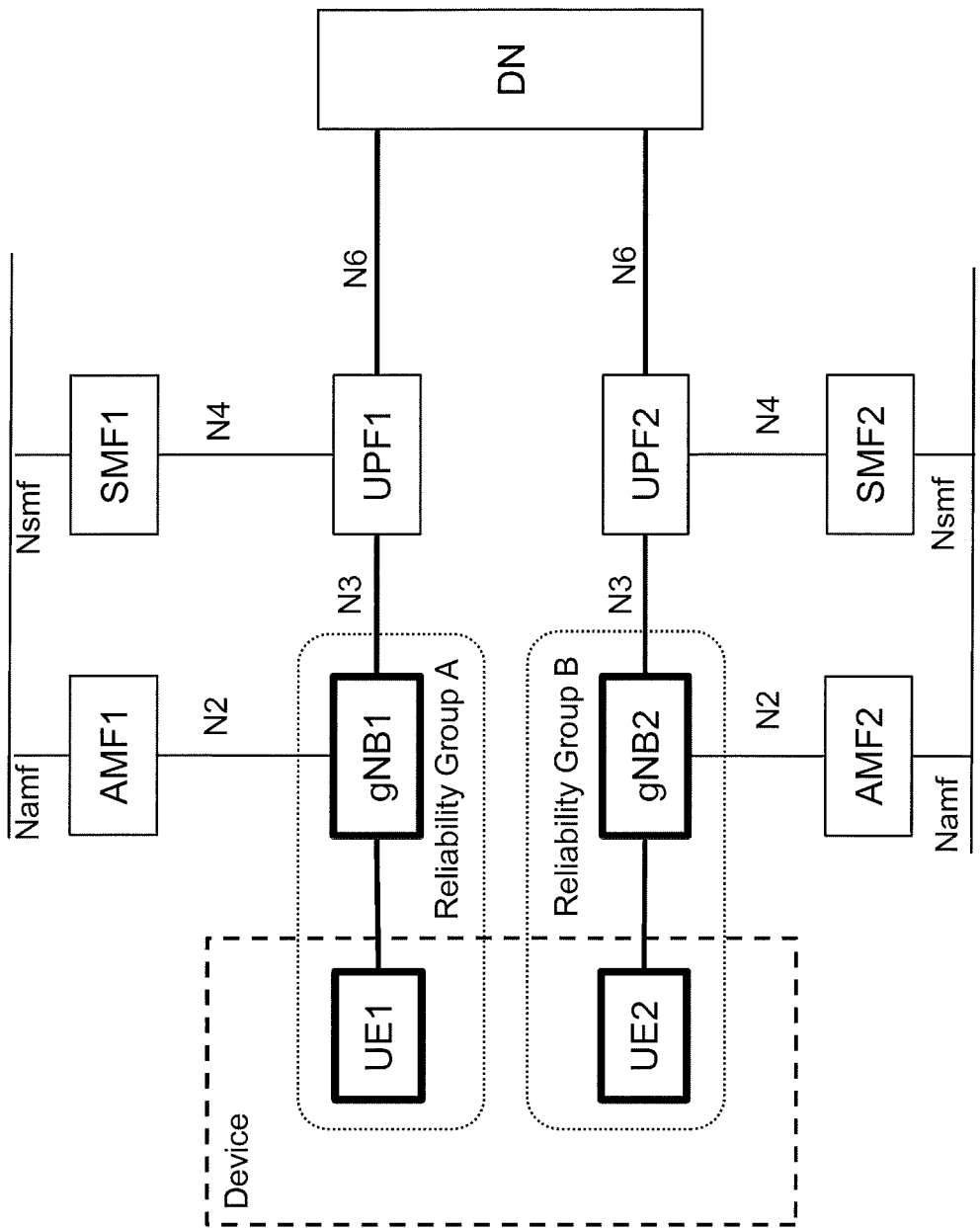
FIG. 2 illustrates an exemplary 5G system providing support for communication with high reliability using a terminal device with multiple physical UEs and redundant RAN and CN nodes.
Figure 3:
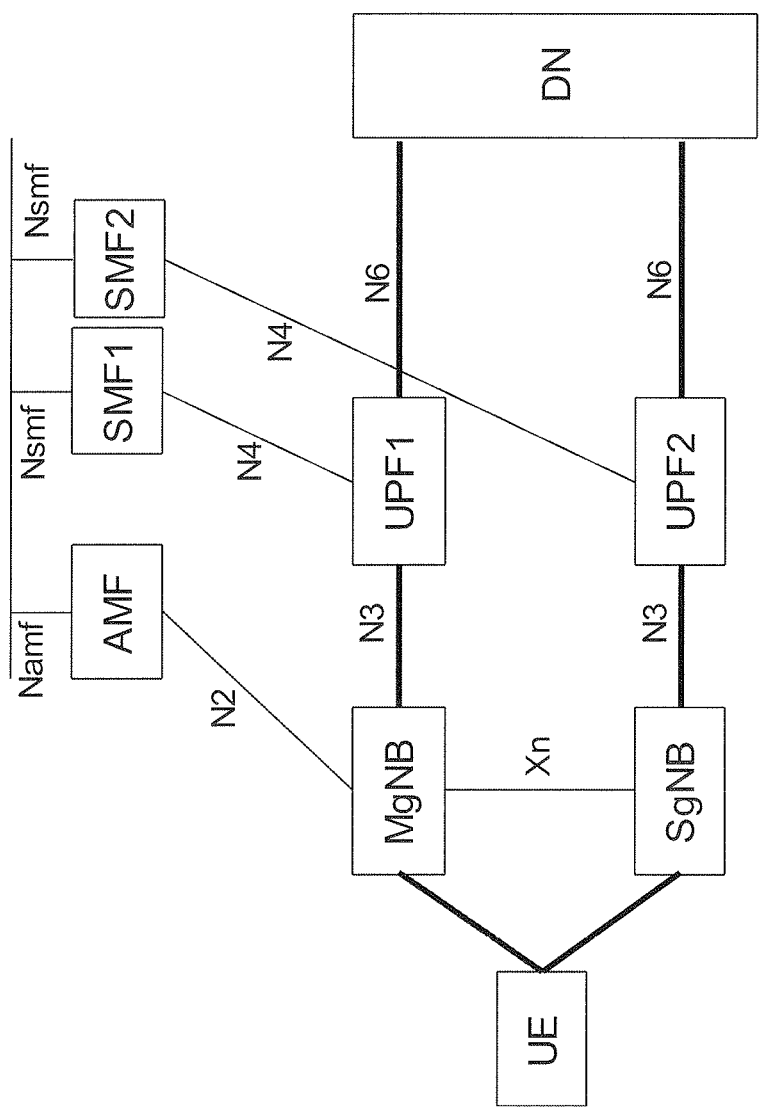
FIG. 3 illustrates an exemplary 5G system providing support for communication with high reliability using Dual Connectivity (DC)

According to the method presented herein, it may be that the redundant communication paths are to be implemented in accordance with a redundancy scheme requiring that the redundant communication paths are fully disjoint on at least the portion of the redundant communication paths. The redundancy scheme may correspond to one of the prior art techniques described above, such as the Dual Connectivity scheme described in relation to FIG. 3 or the scheme involving the use of a terminal device with multiple physical UEs and the provision of redundant RAN coverage using different base stations as described in relation to FIG. 2 above, for example. While, in one variant, information regarding the implementation of the redundancy scheme may be preconfigured in the first node 402, the first node 402 may, in another variant, be instructed to implement the redundancy scheme by another node. In this case, the method first node 402 may receive, prior to triggering determining the current redundancy status, a request from the second node to implement the redundancy scheme. The first node 402 may thus trigger, prior to triggering determining the current redundancy status, implementing the redundancy scheme and, when the redundancy scheme has been implemented successfully, the determined redundancy status may indicate that the redundant communication paths are fully disjoint on at least the portion of the redundant communication paths. When the redundancy scheme cannot be implemented momentarily, the current redundancy status may indicate that the redundant communication paths are not fully disjoint on at least the portion of the redundant communication paths. Determining the current redundancy status may be triggered repeatedly (e.g., periodically), wherein sending the redundancy notification may be triggered each time the current redundancy status is determined to have changed. In this way, the changing success/failure status of the redundancy setup may be reflected by repeated redundancy notifications.

As described above, the portion of the redundant communication paths may belong to a subdomain of the cellular network. While the subdomain may be any subdomain of the cellular network, in one particular implementation, the subdomain may be the RAN of the cellular network. In this implementation, the current redundancy status may be determined based on a redundancy in a RAN of the cellular network. Redundancy in the RAN may relate to the redundant provision of nodes along the redundant communication paths in the RAN and may particularly relate to the redundant provision of base station nodes (e.g., gNBs in a 5G network). Therefore, the current redundancy status may indicate that the redundant communication paths are not fully disjoint on at least the portion of the redundant communication paths when the redundant communication paths include (or "traverse"/"share") a same base station of the RAN. In case it is determined that the redundant communication paths include a same base station node and are therefore not fully disjoint on at least the portion of the redundant communication paths (i.e., in the RAN subdomain), the first node 402 may trigger selecting a different base station of the cellular network for one of the redundant communication paths to make the redundant communication paths disjoint on at least the portion of the redundant communication paths.

In another implementation, the current redundancy status may, alternatively or additionally, be determined based on a redundancy in a CN of the cellular network. Redundancy in the CN may relate to the redundant provision of nodes along the redundant communication paths in the CN and may particularly relate to the redundant provision of gateway nodes (e.g., UPFs in a 5G network). Therefore, the current redundancy status may indicate that the redundant communication paths are not fully disjoint on at least the portion of the redundant communication paths when the redundant communication paths include (or "traverse"/"share") a same gateway node of the CN. In case it is determined that the redundant communication paths include a same gateway node and are therefore not fully disjoint on at least the portion of the redundant communication paths (i.e., in the CN subdomain), the first node 402 may trigger selecting a different gateway node of the cellular network for one of the redundant communication paths to make the redundant communication paths disjoint on at least the portion of the redundant communication paths.

Upon successfully selecting a different node (e.g., a different base station or gateway node) to establish or re-establish redundancy on at least the portion of the redundant communication paths, a redundancy notification including an indication of the then valid current redundancy status may be sent to the second node. Sending the redundancy notification may be delayed so that the notification may not be sent immediately and signaling of quick changes of the redundancy status back and forth may be prevented. In other words, sending the redundancy notification may be triggered upon lapse of a predetermined period of time after triggering determining the current redundancy status. In the redundancy notification, additional information may be provided regarding the current redundancy status. For example, the redundancy notification may include at least one of a reason for non-implementability of the redundancy scheme and an indication on whether the reason is temporary or permanent (or "long-term"). The reason for non-implementability of the redundancy scheme may be indicated to be permanent if a temporary failure cannot be resolved in a predetermined period of time, for example. The redundancy notification may also include information on whether a redundancy scheme may be applicable or not, e.g., due to a UE being in idle mode, for example. While redundancy notifications may be sent as single messages, it will be understood that multiple redundancy notifications may be combined into a single message, such as multiple UE messages combined into a single UE notification, for example.

While, in one variant, information regarding the sending of redundancy notifications may be preconfigured in the first node 402, the first node 402 may, in another variant, obtain such information from another node. In this case, the method may further comprise receiving, prior to triggering sending the redundancy notification, a redundancy notification request from the second node to subscribe for receipt of redundancy notifications. The redundancy notification request may also include configuration options. For example, the redundancy notification request may include at least one of an indication of a predetermined period of time upon which sending the redundancy notification is to be triggered after triggering determining the current redundancy status (or whether it is necessary to immediately signal status changes), and an indication on whether or not redundancy notifications are requested for temporary reasons for non-implementability of the redundancy scheme.

Redundancy notifications may generally be sent on a per UE basis so that the above procedure of determining the current redundancy status and sending redundancy notifications may apply to a given UE. It will be understood, however, that the procedure may also be applied to a given session of a UE (e.g., a PDU session in a 5G network) or a specific flow of a session of a UE (e.g., a QoS flow of a PDU session in a 5G network), for example. In other words, the redundant handling may not only apply to the lower layer connection of a UE to the cellular network, but also to a subset of sessions or data flows on higher layers. For example, it may be possible that multiple sessions are transferred over the same lower layer connection, wherein some of them are not subject to redundant handling. Also, it may be possible that sessions with redundant handling also carry other flows which are not subject to redundant handling. Generally speaking, it may therefore be said that the connection corresponds to at least one of a (lower layer) connection established between the UE and the cellular network (e.g., a layer 2 or layer 3 connection), a (higher layer) session established between the UE and the cellular network, and a flow of a (higher layer) session established between the UE and the cellular network (the higher layer corresponding to a layer above layer 3, for example).

Figure 6A:
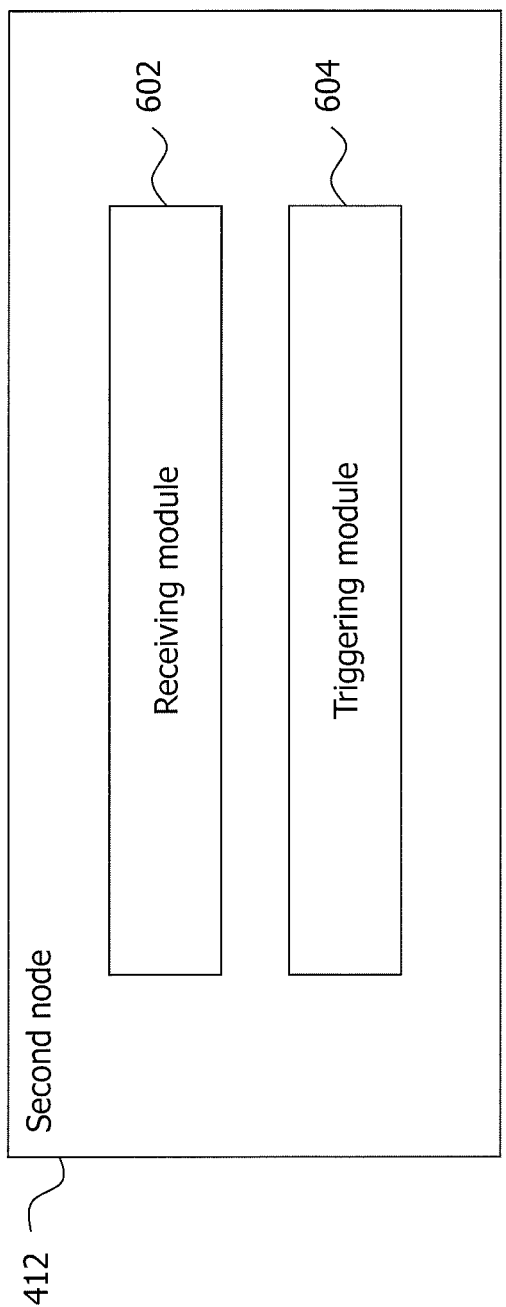
FIGS. 6*a* and 6*b* illustrate a modular composition of the second node and a corresponding method embodiment which may be performed by the second node.
Figure 6B:
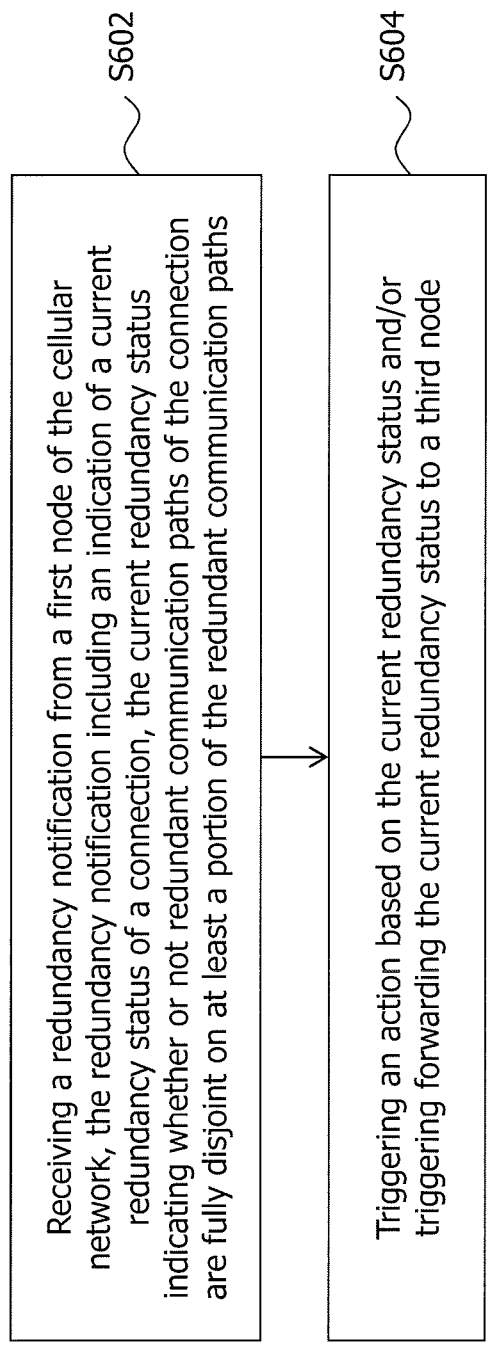

FIG. 6a schematically illustrates an exemplary modular composition of the second node 412 and FIG. 6b illustrates a corresponding method which may be performed by the second node 412. The basic operation of the second node 412 will be described in the following with reference to both FIGS. 6a and 6b. This operation may be complementary to the operation of the first node 402 described above in relation to FIGS. 5a and 5b and, as such, aspects described above with regard to the operation of the second node may be applicable to the operation of the second node 412 described in the following as well. Unnecessary repetitions are thus omitted in the following.

In step S602, a receiving module 602 of the second node 412 may receive a redundancy notification from a first node of the cellular network (e.g., the first node 402), wherein the redundancy notification includes an indication of a current redundancy status of the connection, the current redundancy status indicating whether or not the redundant communication paths are fully disjoint on at least a portion of the redundant communication paths. In step S604, a triggering module 604 of the second node 412 may trigger an action based on the current redundancy status and/or trigger forwarding the current redundancy status to a third node.

When the current redundancy status indicates that the redundant communication paths are not fully disjoint on at least the portion of the redundant communication paths, the action may comprise at least one of releasing one of the redundant communication paths, re-establishing one of the redundant communication paths with a different configuration, pausing an application using the redundant communication paths for communication, applying at least one change to a network deployment associated with the redundant communication paths, and enhancing a network deployment associated with the redundant communication paths based on statistics collected on the current redundancy status. As said, alternatively or additionally, the method may further comprise triggering forwarding the current redundancy status to a third node (optionally along a whole chain of network entities), which then may trigger corresponding actions.

As in the method described in relation to FIGS. 5a and 5b, it may be that the redundant communication paths are to be implemented in accordance with a redundancy scheme requiring that the redundant communication paths are fully disjoint on at least the portion of the redundant communication paths. The second node 412 may further trigger sending, prior to receiving the redundancy notification, a request to the first node to implement the redundancy scheme. When the redundancy scheme cannot be implemented momentarily, the current redundancy status may indicate that the redundant communication paths are not fully disjoint on at least the portion of the redundant communication paths.

The redundancy notification may include at least one of a reason for non-implementability of the redundancy scheme, and an indication on whether the reason is temporary or permanent. The second node 412 may further trigger sending, prior to receiving the redundancy notification, a redundancy notification request to the first node to subscribe for receipt of redundancy notifications. The redundancy notification request may include at least one of an indication of a predetermined period of time upon which sending the redundancy notification is to be triggered after triggering determining the current redundancy status, and an indication on whether or not redundancy notifications are requested for temporary reasons for non-implementability of the redundancy scheme. The connection may correspond to at least one of a connection established between the UE and the cellular network, a session established between the UE and the cellular network, and a flow of a session established between the UE and the cellular network.

The following FIGS. 7 to 10 illustrate exemplary embodiments which elucidate possible implementations of the above general description of the technique presented herein in more detail.

Figure 7:
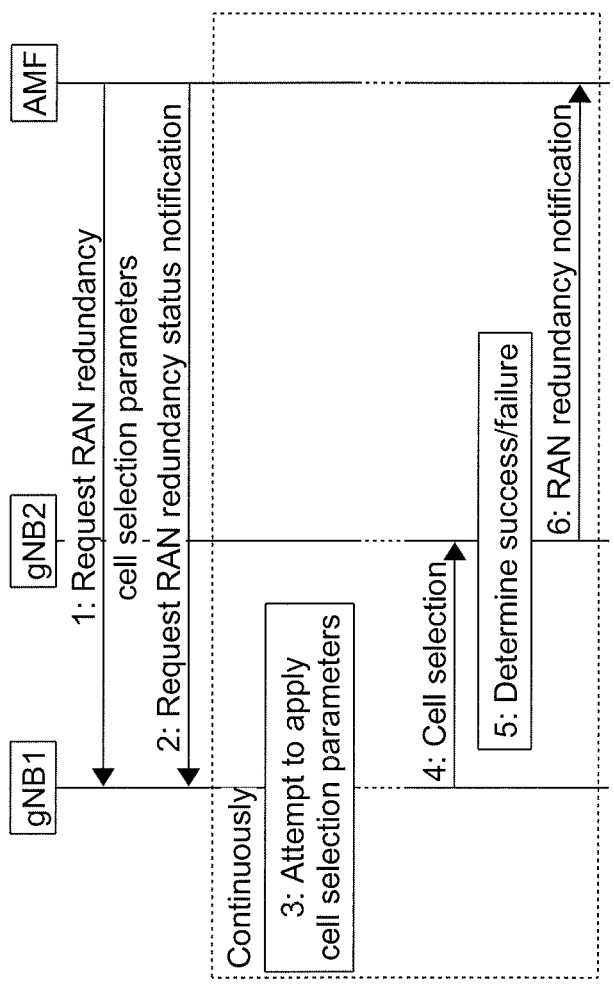
FIG. 7 illustrates a signaling diagram of an exemplary basic procedure for monitoring a redundancy status of a connection in a RAN according to the present disclosure.

FIG. 7 illustrates an exemplary basic procedure for monitoring a redundancy status of a connection in the RAN subdomain of a cellular network which, in the shown example, corresponds to a 5G network. It will be understood that the procedure is not limited to 5G networks but may likewise be employed in other mobile communication networks, such as 3G or 4G networks, for example.

In step 1 of the procedure, an AMF (e.g., corresponding to the second node 412) may send a request to a first gNB (gNB1) (e.g., corresponding to the first node 402) of the RAN, requesting to implement a RAN redundancy scheme, e.g., by providing corresponding cell selection parameters to the first gNB that determine a cell to be used for user plane traffic and that determine that redundant (disjoint) communication paths are to be used for redundant handling of the traffic in the RAN. In step 2, the AMF may send a redundancy notification request to the first gNB to subscribe for receipt of redundancy status notifications. The first gNB may store the subscription information in the UE context to make sure that redundancy notifications will later be sent to the AMF. In step 3, the first gNB may attempt to implement the redundancy scheme, e.g., by applying the cell selection parameters. This may involve Dual Connectivity (DC) establishment or handover decisions, for example, optionally considering idle or inactive mode cell selection parameter settings. In step 4, which may only be performed when redundancy needs to be established among the gNBs of the RAN, a second gNB (gNB2) may be selected (e.g., in a corresponding cell selection procedure), leading to a gNB change from the first gNB to the second gNB and providing redundancy for the redundant communication paths. Step 4 may be omitted when RAN redundancy was already available previously.

In step 5, one of the gNBs may then determine whether the redundancy scheme could be successfully implemented, e.g., whether the cell selection parameters could successfully applied. In the shown example, this is done by the second gNB and the second gNB thus sends, in step 6, a redundancy notification indicating the success or failure of the implementation of the redundancy scheme to the AMF. It will be understood, that the determination according to step 5 as well as sending the redundancy notification according to step 6 can also be performed by the first gNB. As indicated in the figure, steps 3 to 6 may be applied continuously so that cell/gNB changes (e.g., arising from the cell selection parameters and considering radio resource and traffic changes) are monitored and corresponding changes of the redundancy status may be reported through the redundancy notifications repeatedly. For example, it may be possible that redundant user plane handling can be set up originally, but later fails and is thus to be re-established again. These changes may then be reflected by repeated redundancy notifications according to step 6.

It will be understood that the above basic procedure is merely exemplary and that variants of the procedure are generally conceivable. For example, it may be conceivable that steps 1 and 2 are combined into a single message or that step 2 is performed at a later point of time, such as after step 3 or step 5. Step 2 may also be performed separately for a collection of UEs, PDU sessions or flows, for example. Step 2 can further be omitted when the subscription for redundancy notifications is preconfigured in the RAN. Steps 5 and 6 could also be executed before step 3 in order to provide an initial notification as soon as possible, followed by another redundancy notification after step 3. Also, it will be understood that the request in step 1 may originate from other sources than the AMF, e.g., even from a chain of originating services, optionally including an SMF or Network Exposure Function (NEF). Similarly, the redundancy notification in step 6 may be forwarded from the AMF to other network entities, e.g., along a chain of network entities. For example, a notification may be sent to an SMF, a UPF and/or an NEF, or even to entities external to the cellular network, such as a CNC or CUC, as known from TSN, for example.

Moreover, it may be conceivable to combine multiple messages of step 6 into a single message, e.g., multiple UE messages into a single message. The message of step 6 may be delayed and not be sent immediately so that the signaling of quick changes back and forth may be prevented. Parameters regarding how much delay is possible may be preconfigured in the RAN. It may further be conceivable to combine the redundancy notification with other messages. In particular, in the redundancy notification, additional information may be provided regarding the current redundancy status. For example, the redundancy notification may provide information on whether a failure is assumed to be temporary only or permanent/long-term. In case a temporary failure cannot be resolved in a preset period of time, this may be indicated as a permanent/long-term failure. The redundancy notification may also contain information as to whether the redundancy setup may currently be applicable or not, e.g., due to a UE being in idle mode. The redundancy notification request may include information as to which type of notifications are requested, e.g., whether temporary failure notifications are requested or not, and as to the allowed delay in the notifications (e.g., indicating whether it is necessary to immediately signal status changes or whether it is allowed to wait for a predetermined amount of time before changes are signaled).

The AMF, or another entity, receiving the redundancy notifications of step 6 including the indications of the current redundancy status may then take action accordingly, including e.g. releasing a redundant user plane path in case of a failure, establishing or re-establishing a user plane path with a different set of parameters, pausing an application while redundancy is not available, performing corrective actions in a network deployment, such as moving devices or antennas to other locations, or changing other network deployment parameters, and collecting statistics from the notifications based on which the network deployment may be enhanced, for example. The redundancy notifications may thus enable an application or a network operator to become aware of whether redundancy for the connection is available or not and to take measures when a failure can cause significant harm, for example.

FIG. 8 illustrates a signaling diagram of an exemplary procedure for monitoring a redundancy status of a connection in a RAN of a 5G network for the case of a redundancy scheme involving a terminal device with multiple physical UEs and redundant RAN nodes using static reliability groups, as described above in relation to FIG. 2. More specifically, in this example, the disjoint user plane paths may be based on multiple UEs being integrated into a single device, wherein the UEs and the (cells of the) gNBs may be grouped into reliability groups so that each UE preferably connects to a gNB in the same reliability group. In the shown example, there are two reliability groups, wherein UE1 preferably connects to gNB1 and UE2 preferably connects to gNB2. The cell/gNB selection may be realized using target selection during handover. In other words, whenever possible, the UEs may be handed over to a gNB in the same reliability group and, in case a UE connects to a gNB in a different reliability group, it may be handed over to another gNB in the right reliability group, when possible.

More specifically, in step 1 of the procedure, UE1 may register with the network via gNB1, wherein it may be determined that UE1 belongs to reliability group 1 (RG=1). In step 2, when the RAN context is set up (e.g., using a service request procedure), the reliability group of UE1 may be indicated to gNB1 and, also, a redundancy notification request may be sent from AMF1 to gNB1. The individual steps of the registration procedure are not shown in the figure for the sake of clarity. As UE1 has connected to gNB1 (both of which are in the same reliability group), the redundancy setup can be regarded successful. In steps 3 and 4, this success may be indicated to AMF1 using a redundancy notification, wherein AMF1 may forward this indication to the NEF which, in turn, may forward the indication to an external entity, such as a CNC or CUC, acting as a centralized point of network configuration, as known from TSN, for example.

In step 5, UE2 may register with the network via gNB1, wherein it may be determined that UE2 belongs to reliability group 2 (RG=2). In step 6, when the RAN context is set up (e.g., using a service request procedure), the reliability group of UE2 may be indicated to gNB1 and, also, a redundancy notification request may be sent from AMF2 to gNB1. As UE2 is currently connected to gNB1, which is not in the same reliability group as UE2, a redundancy notification indicating a temporary failure may be sent to AMF2. This may happen because UE2 may start registration at any gNB without detecting the gNB's reliability group. The indication may again be forwarded to the external entity (cf. steps 7 and 8). In order to establish full redundancy in the RAN, gNB1 may then initiate a handover of UE2 to gNB2, which is in the same reliability group as UE2. As the redundancy setup is now successful, a redundancy notification indicating success may be sent to AMF2, NEF and the external entity in steps 10 and 11.

In case one of the UEs is later handed over to another gNB, which is in a different reliability group than that of the UE, a failure notification may be sent again, and a success notification may be sent once the UE is handed over to the right gNB in the reliability group of this UE. In this example, it may thus be said that redundancy notifications may be sent based on whether a given UE's requested RAN node could be selected or not. Also, a given UE's indication may not depend on another UE's status. The notification information may be sent on a per UE basis, but it will be understood that it is also possible to signal such information on a per PDU session basis, where an indication may be sent for each PDU session that is subject to redundant handling. The PDU session indication may be sent by the gNB or by other entities (e.g., the AMF, SMF or NEF) which may translate the per UE indications to a per PDU session set of indications.

Figure 9A:
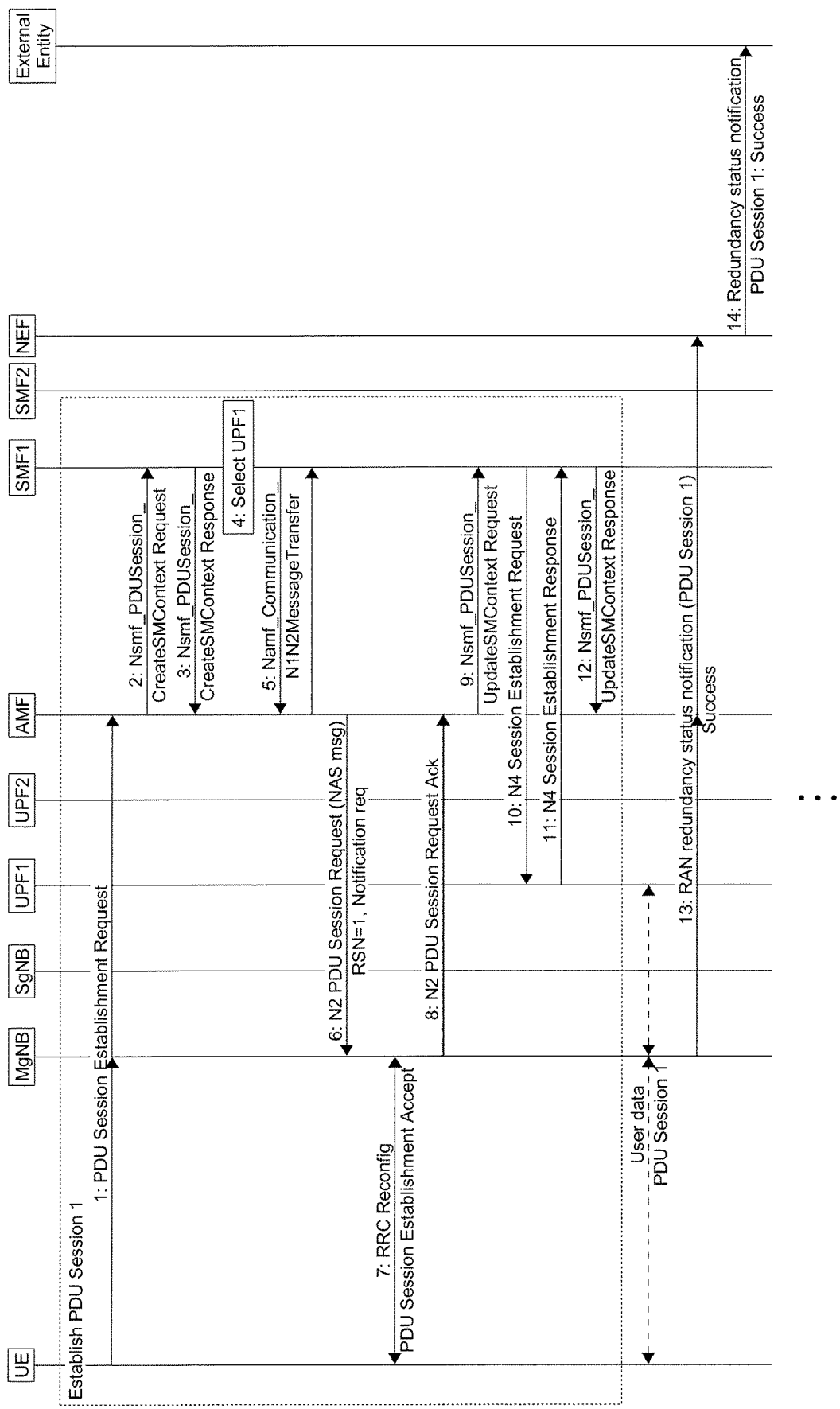
FIGS. 9*a* and 9*b* illustrate a signaling diagram of an exemplary procedure for monitoring a redundancy status of a connection in a RAN of a 5G network for the case of a redundancy scheme involving Dual Connectivity according to the present disclosure.
Figure 9B:
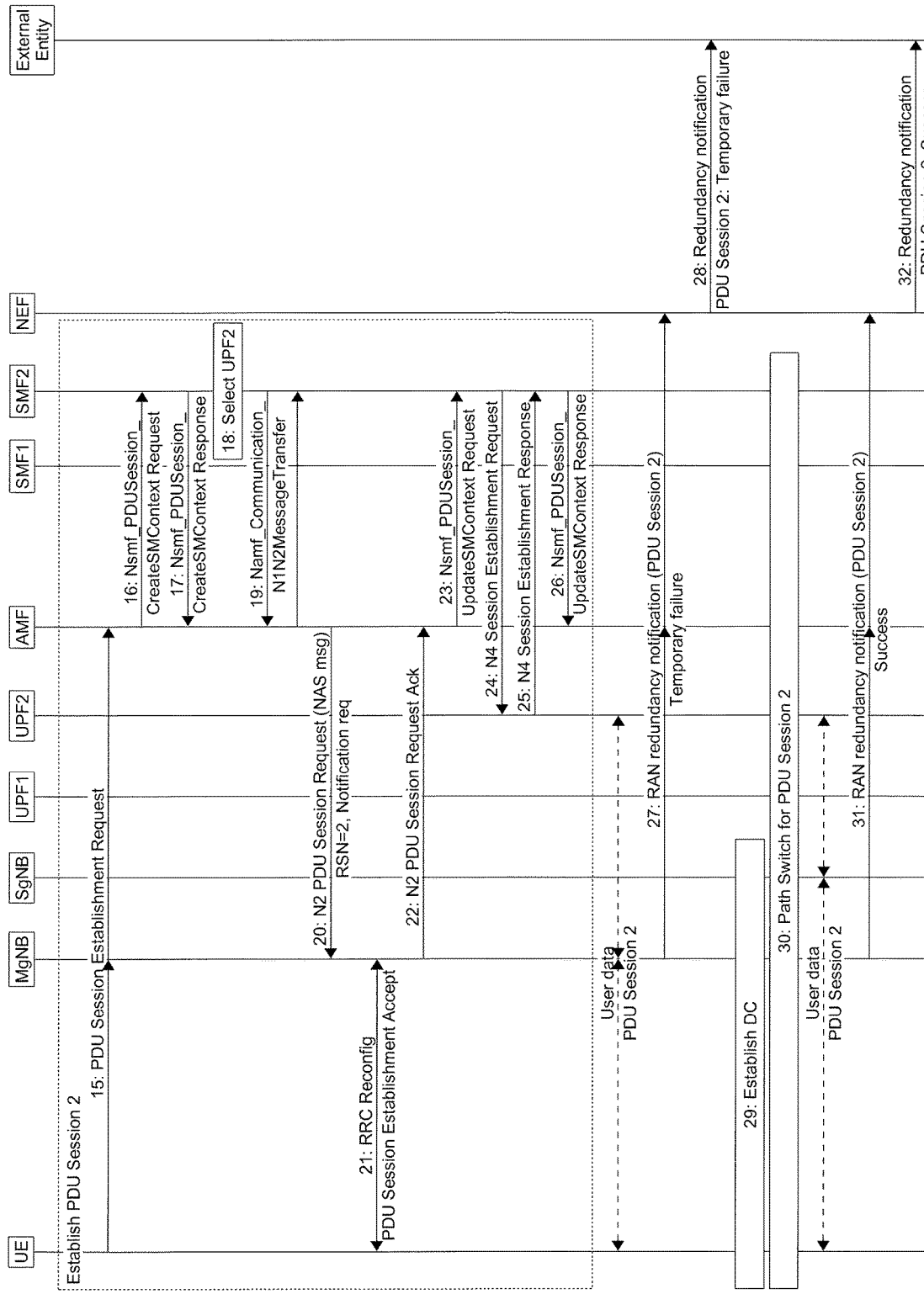

FIGS. 9a and 9b illustrate a signaling diagram of an exemplary procedure for monitoring a redundancy status of a connection in a RAN of a 5G network for the case of a redundancy scheme involving Dual Connectivity, as described above in relation to FIG. 3. In this example, the disjoint user plane paths are based on the RAN dual connectivity feature, wherein a single UE sets up two PDU sessions, and wherein the first PDU session goes via the MgNB and the second PDU session goes via the SgNB once dual connectivity is established.

In FIG. 9a, steps 1 to 12 relate to establishing the first PDU session, which may be performed following a standard UE requested PDU session establishment procedure.

Within this procedure, SMF1 may determine, based on a combination of a UE indication and a network configuration, that redundant PDU session handling is requested. For the first PDU session, UPF1 may be selected accordingly. Further, in the signaling from SMF1 to the AMF and further to the MgNB, it may be indicated that redundant RAN handling is requested using a redundancy sequence number parameter set to 1 (RSN=1) provided to the MgNB. In this signaling, redundancy notifications may be requested as well. As a result of the PDU session establishment, the user plane may be set up via MgNB and UPF1. Then, given that the first PDU session is supposed to go via the MgNB according to the redundancy scheme, a redundancy notification may be sent from the MgNB to the AMF indicating the successful setup of the session. The notification may be forwarded further, e.g., via the NEF to an external entity, such as a CNC or CUC (cf. steps 13 and 14).

In FIG. 9b, steps 15 to 26 relate to establishing the second PDU session, which may be established in a similar way as the first PDU session. Thus, within this procedure, SMF2 may determine, based on a combination of a UE indication and a network configuration, that redundant PDU session handling is requested. For the second PDU session, UPF2 may be selected accordingly. Further, in the signaling from SMF2 to the AMF and further to the MgNB, it may be indicated that redundant RAN handling is requested using a redundancy sequence number parameter set to 2 (RSN=2) provided to the MgNB. In this signaling, redundancy notifications may be requested as well. As a result of the PDU session establishment, the user plane may be set up via MgNB and UPF2. The reason why the second PDU session may also run via the MgNB is that it may take time to establish dual connectivity via the SgNB and that, for setting up dual connectivity, it may be necessary to first establish the first session. Then, given that the second PDU session is intended to go via the SgNB (rather than the MgNB), but dual connectivity is not yet established, the redundancy setup may not yet be regarded as complete and, therefore, a temporary failure indication may be sent from the MgNB (which may be responsible for UE signaling in the RAN) to the AMF and further to the NEF as well as the external entity (cf. steps 27 and 28).

In step 29, dual connectivity may then be established in the RAN, with the first PDU session going via the MgNB and the second PDU session going via the SgNB. In step 30, the user plane paths for PDU sessions may be switched following known dual connectivity procedures. Given that redundancy is now established in the RAN, a success notification may be sent from the MgNB to the AMF, which may again forward the notification to the NEF and the external entity (cf. steps 31 and 32). In case dual connectivity is later disabled, e.g., due to lack of sufficient coverage or lack of radio resources, a failure notification may be sent for the second PDU session because the second PDU session is the one which is supposed to go via the SgNB. A success notification may be sent when dual connectivity is re-established again.

Figure 10:
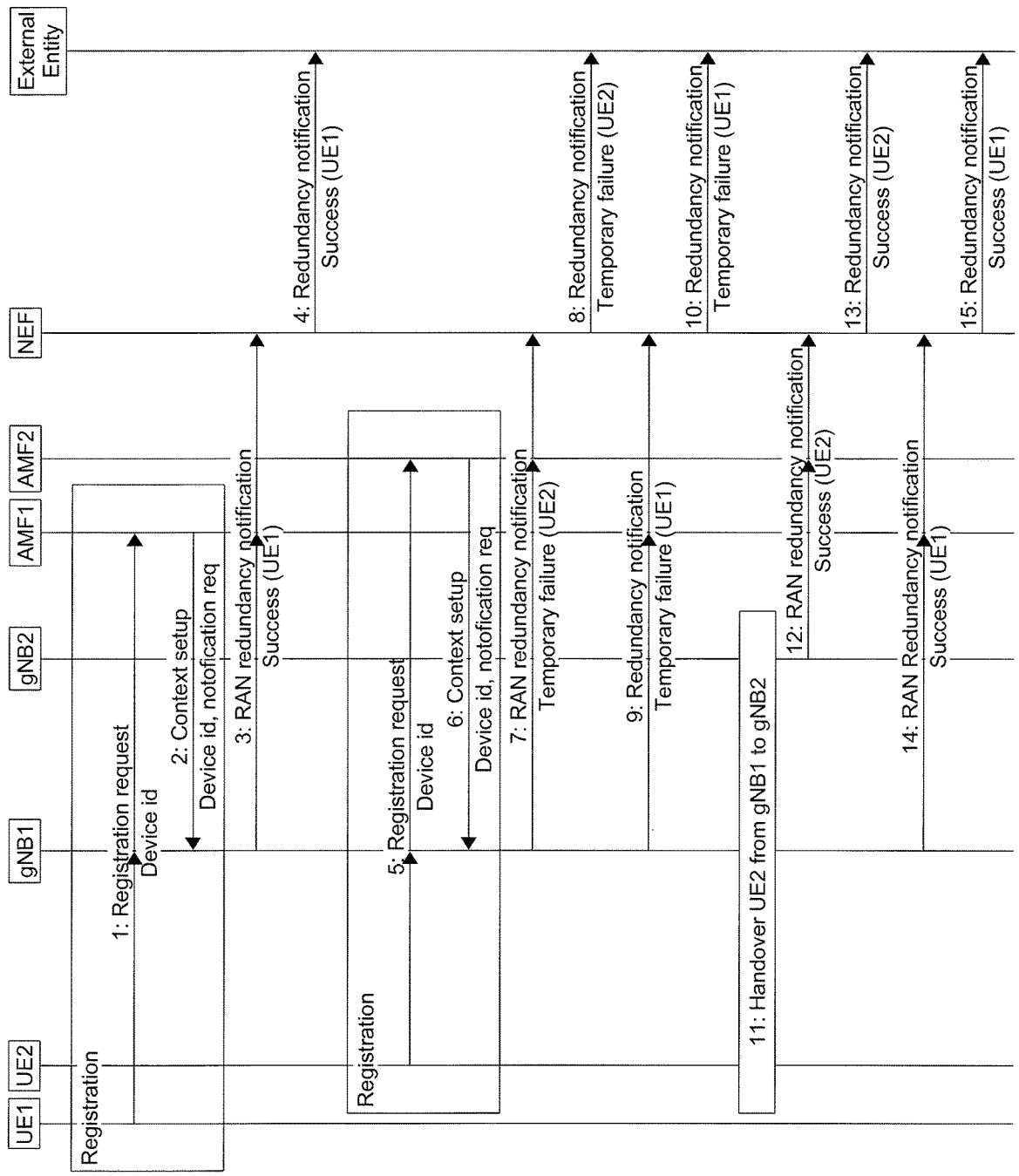
FIG. 10 illustrates a signaling diagram of an exemplary procedure for monitoring a redundancy status of a connection in a RAN of a 5G network for the case of a redundancy scheme involving a terminal device with multiple physical UEs and redundant RAN nodes without using static reliability groups according to the present disclosure.

FIG. 10 illustrates a signaling diagram of an exemplary procedure for monitoring a redundancy status of a connection in a RAN of a 5G network for the case of a redundancy scheme involving a terminal device with multiple physical UEs and redundant RAN nodes without using static reliability groups. This example differs from the example of FIG. 8 in that, rather than grouping UEs and gNBs into static reliability groups, it may be dynamically checked whether UE1 and UE2 connect to the same gNB. For this, a device ID may be provided either by the UE or by the network, wherein the device ID is the same for both UEs of the device. The device ID may be provided to a gNB of the RAN, which can use it to check whether the UEs having the same device ID are connected to the network. If so, the gNB may select one of the UEs to perform a handover. In handover decisions, the gNB may check that handover targets to which the other UE of the same device is connected are avoided.

More specifically, the differences to the example of FIG. 8 are as follows. Instead of a reliability group, the UEs may provide the device ID in steps 1 and 5 of the procedure. As an alternative, the device ID may also be derived in the network from other parameters. Instead of the reliability group, it may thus be the device ID which is provided to the RAN in steps 2 and 6. After step 6, gNB1 may detect that two UEs are connected from the same device. In steps 7 to 10, temporary failure notifications may then be sent for both UEs because, in this example, the UEs are dependent on each other in terms of the redundancy status and because the RAN may detect that connectivity is not handled by redundant gNBs. In the notifications, it may be indicated that the respective redundancy notifications are dependent on each other accordingly. Such indications may be useful to avoid that an external configuration entity releases both communication legs automatically. After the temporary redundancy failure is resolved by performing a handover of UE2 from gNB1 to gNB2 in step 11, corresponding success indications may be sent for both UEs in steps 12 to 15.

In this example, a failure indication may be sent for both UEs in case the UEs are connected to the same gNB. It will be understood, however, that it may also be possible to send a failure indication for one of the UEs only, e.g., designating one UE as the primary UE and sending a notification for that UE only. The interpretation of such indication may be agreed in advance so that the nodes receiving the indication can interpret it accordingly.

As described in the above examples, redundancy notifications indicating the redundancy status may be forwarded along chains of network entities, wherein each entity may take actions based on the redundancy status. Exemplary notification chains may include one of the following chains: gNB to AMF to NEF to external entity, gNB to AMF to SMF to NEF to external entity, gNB to AMF to SMF to Policy Control Function (PCF) to external entity, and gNB to AMF to SMF to UPF to Ethernet switch to external entity (here, the UPF to Ethernet switch interface may be proprietary, or alternatively, the UPF may be combined with the Ethernet switch; the external entity may be notified over the Ethernet switch's management interface). In each of these examples, the external entity may correspond to a CNC or CUC, as known from TSN, for example, and may act as an Application Function (AF) from the 5G networks perspective. It will be understood that other signaling paths are generally conceivable as well.

While the exemplary procedures described above focus on RAN redundancy, it will further be understood that similar procedures may be employed for CN redundancy. For example, it may be conceivable to provide redundancy status notifications for gateway nodes of the cellular network, such as UPF nodes in a 5G network. An SMF may provide notifications based on whether or not a UPF could be allocated according to a requested level of redundancy. For example, if the SMF detects that a UPF could not be allocated for a PDU session so that the UPF is ensured to be different from another UPF used for another PDU session of the same device, the SMF may provide corresponding redundancy notifications to other entities, such as the NEF or the PCF, for example. It may also be conceivable to add information on the UPF redundancy status to the redundancy notifications coming from the RAN, i.e., in other words, the SMF may enrich the information contained in the redundancy notifications received from the RAN (as described above) by adding information as to whether or not the UPFs could be allocated redundantly as well. In one variant, this information may be added as additional information to the RAN redundancy notification and, in another variant, the RAN's redundancy status may be altered depending on the determined CN redundancy status. For example, even if the RAN redundancy status indicates success, this can be changed to redundancy failure if the UPFs in the CN are not redundant. Other available information may be added as well, such as information on the transport network redundancy status or on the current level of redundancy applied at other entities (e.g., a redundancy level in the control plane, in the management plane, or even regarding power supplies). Information on radio link failure and other node or link failures detected on the end-to-end redundancy path may also be included, when available.

As has become apparent from the above, the present disclosure provides a technique for monitoring a redundancy status of a connection established between a UE and a cellular network. While, in fixed networks, the topology typically does not change once disjoint communication paths are established, in mobile networks, the paths that are originally disjoint may not always remain disjoint, due to uncertainties such as the current availability of redundant RAN coverage, the current radio link quality over the redundant paths, radio resource limitations based on the instantaneous traffic conditions and user mobility patterns, and node resource constraints, for example. According to the presented technique, information on whether or not redundancy is currently available on at least a portion of the redundant communication paths may be collected and, based on that information, a network management system or a network operator may decide on further actions, such as stopping the communication, disabling the disjoint user plane paths, or collecting statistical data based on which the network deployment may be enhanced, for example. In case of RAN redundancy, for example, RAN nodes may be requested to provide redundancy notifications and, when the redundancy status of a path changes in the RAN (i.e., when one path no longer fulfills the requested redundancy parameters in the RAN, or the parameters are again fulfilled), the RAN nodes may provide notifications about the changes in the redundancy status. Based on these notifications, other network nodes or the network operator may decide on corrective actions, as described above.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for monitoring a redundancy status of a connection established between a User Equipment, UE, and a cellular network, the connection being established using redundant communication paths between the UE and the cellular network, the method being performed by a first node of the cellular network and comprising:
    receiving a request from a second node of the cellular network to implement a redundancy scheme, the redundant communication paths to be implemented in accordance with the redundancy scheme, the redundancy scheme requiring that the redundant communication paths are fully disjoint on at least a portion of the redundant communication paths;
    subsequent to receiving the request to implement the redundancy scheme, triggering determining a current redundancy status of the connection, the current redundancy status indicating whether or not the redundant communication paths are fully disjoint on at least the portion of the redundant communication paths; and
    triggering sending a redundancy notification to the second node, the redundancy notification including an indication of the determined current redundancy status.

2. The method of claim 1, wherein, when the redundancy scheme cannot be implemented momentarily, the current redundancy status indicates that the redundant communication paths are not fully disjoint on at least the portion of the redundant communication paths.

3. The method of claim 1, wherein determining the current redundancy status is triggered repeatedly and wherein sending the redundancy notification is triggered each time the current redundancy status is determined to have changed.

4. The method of claim 1, wherein the current redundancy status is determined based on a redundancy in a Radio Access Network, RAN, of the cellular network.

5. The method of claim 4, wherein the current redundancy status indicates that the redundant communication paths are not fully disjoint on at least the portion of the redundant communication paths when the redundant communication paths include a same base station of the RAN.

6. The method of claim 5, further comprising:
    triggering selecting a different base station of the cellular network for one of the redundant communication paths to make the redundant communication paths disjoint on at least the portion of the redundant communication paths.

7. The method of claim 1, wherein the current redundancy status is determined based on a redundancy in a Core Network, CN, of the cellular network.

8. The method of claim 7, wherein the current redundancy status indicates that the redundant communication paths are not fully disjoint on at least the portion of the redundant communication paths when the redundant communication paths include a same gateway node of the CN.

9. The method of claim 8, further comprising:
    triggering selecting a different gateway node of the cellular network for one of the redundant communication paths to make the redundant communication paths disjoint on at least the portion of the redundant communication paths.

10. The method of claim 1, wherein the redundancy notification includes at least one of:
    a reason for non-implementability of the redundancy scheme; and
    an indication on whether the reason is temporary or permanent.

11. The method of claim 1, further comprising:
    receiving, prior to triggering sending the redundancy notification, a redundancy notification request from the second node to subscribe for receipt of redundancy notifications.

12. A method for monitoring a redundancy status of a connection established between a User Equipment, UE, and a cellular network, the connection being established using redundant communication paths between the UE and the cellular network, the method being performed by a second node of the cellular network and comprising:
    receiving a redundancy notification from a first node of the cellular network, the redundancy notification including an indication of a current redundancy status of the connection, the current redundancy status indicating whether or not the redundant communication paths are fully disjoint on at least a portion of the redundant communication paths; and triggering an action based on the current redundancy status, and when the current redundancy status indicates that the redundant communication paths are not fully disjoint on at least the portion of the redundant communication paths, the action comprises at least one of:

releasing one of the redundant communication paths;

re-establishing one of the redundant communication paths with a different configuration;

pausing an application using the redundant communication paths for communication;

applying at least one change to a network deployment associated with the redundant communication paths; and enhancing a network deployment associated with the redundant communication paths based on statistics collected on the current redundancy status.

13. The method of claim 12, further comprising:
triggering forwarding the current redundancy status to a third node.

14. The method of claim 12, wherein the redundant communication paths are to be implemented in accordance with a redundancy scheme requiring that the redundant communication paths are fully disjoint on at least the portion of the redundant communication paths.

15. A first node of a cellular network for monitoring a redundancy status of a connection established between a User Equipment, UE, and the cellular network, the connection being established using redundant communication paths between the UE and the cellular network, the first node comprising processing circuitry configured to:

receive a request from a second node of the cellular network to implement a redundancy scheme, the redundant communication paths to be implemented in accordance with the redundancy scheme, the redundancy scheme requiring that the redundant communication paths are fully disjoint on at least a portion of the redundant communication paths;

subsequent to receiving the request to implement the redundancy scheme, trigger determining a current redundancy status of the connection, the current redundancy status being configured to indicate whether or not the redundant communication paths are fully disjoint on at least the portion of the redundant communication paths; and trigger sending a redundancy notification to the second node, the redundancy notification being configured to include an indication of the determined current redundancy status.

16. A second node of a cellular network for monitoring a redundancy status of a connection established between a User Equipment, UE, and the cellular network, the connection being established using redundant communication paths between the UE and the cellular network, the second node comprising processing circuitry being configured to:

receive a redundancy notification from a first node of the cellular network, the redundancy notification being adapted to include an indication of a current redundancy status of the connection, the current redundancy status being configured to indicate whether the redundant communication paths are fully disjoint on at least a portion of the redundant communication paths; and trigger an action based on the current redundancy status, and when the current redundancy status indicates that the redundant communication paths are not fully disjoint on at least the portion of the redundant communication paths, the action comprises at least one of:

releasing one of the redundant communication paths;

re-establishing one of the redundant communication paths with a different configuration;

pausing an application using the redundant communication paths for communication;

applying at least one change to a network deployment associated with the redundant communication paths; and enhance a network deployment associated with the redundant communication paths based on statistics collected on the current redundancy status.

* * * * *